United States Patent [19]

Magee

[11] Patent Number: 4,862,758

[45] Date of Patent: Sep. 5, 1989

[54] HINGE ASSEMBLY FOR FOLDING IMPLEMENT FRAME

[75] Inventor: Kevin J. Magee, Romeoville, Ill.

[73] Assignee: J. I. Case Company, Racine, Wis.

[21] Appl. No.: 140,977

[22] Filed: Jan. 6, 1988

Related U.S. Application Data

[63] Continuation of Ser. No. 871,364, Jun. 6, 1986, abandoned.

[51] Int. Cl.$^4$ .............................................. F16H 21/44
[52] U.S. Cl. ....................................... 74/103; 172/311
[58] Field of Search ................. 74/103, 104, 105, 106; 172/311, 446, 456

[56] References Cited

U.S. PATENT DOCUMENTS

| | | | |
|---|---|---|---|
| 3,797,580 | 3/1974 | Roth | 172/311 |
| 4,023,623 | 5/1977 | Anderson | 172/456 X |
| 4,074,766 | 2/1978 | Orthman | 172/456 X |
| 4,232,747 | 11/1980 | Pfenninger et al. | 172/311 |
| 4,318,444 | 3/1982 | Haile | 172/456 |
| 4,373,591 | 2/1983 | Schaff et al. | 74/105 X |
| 4,401,179 | 8/1983 | Anderson | 74/105 X |
| 4,479,554 | 10/1984 | Kueker | 74/104 X |
| 4,512,416 | 4/1985 | Smith | 172/311 X |
| 4,542,913 | 9/1985 | Giesmann | 74/104 X |
| 4,561,505 | 10/1985 | Williamson | 172/446 X |

FOREIGN PATENT DOCUMENTS

1197130 11/1985 Canada .

*Primary Examiner*—Kenneth J. Dorner
*Assistant Examiner*—Jose V. Chen
*Attorney, Agent, or Firm*—Dressler, Goldsmith, Shore, Sutker & Milnamow, Ltd.

[57] ABSTRACT

An implement floating frame hinge assembly is provided for accommodating the folding of pivotally connected first and second frame sections wherein a first lever is pivotally connected to the first frame section, a second lever is connected between the second frame section and the first lever, an an extendable and retractable actuator is pivotally connected between the first frame section and the second lever. The assembly includes a connection of the second lever to the second frame section about a pivot axis fixed relative to the second frame section. A pin is moveable with the second lever at a fixed distance from the pivot axis of the connection between the second frame section and the second lever. The first lever defines an elongated slot means for receiving the pin to accommodate relative movement between the pin and the first lever whereby relative pivoting movement between the frame sections can occur even after the frame sections have been unfolded and whereby, during the folding of the frame sections, the pin remains at one end of the slot means.

3 Claims, 2 Drawing Sheets

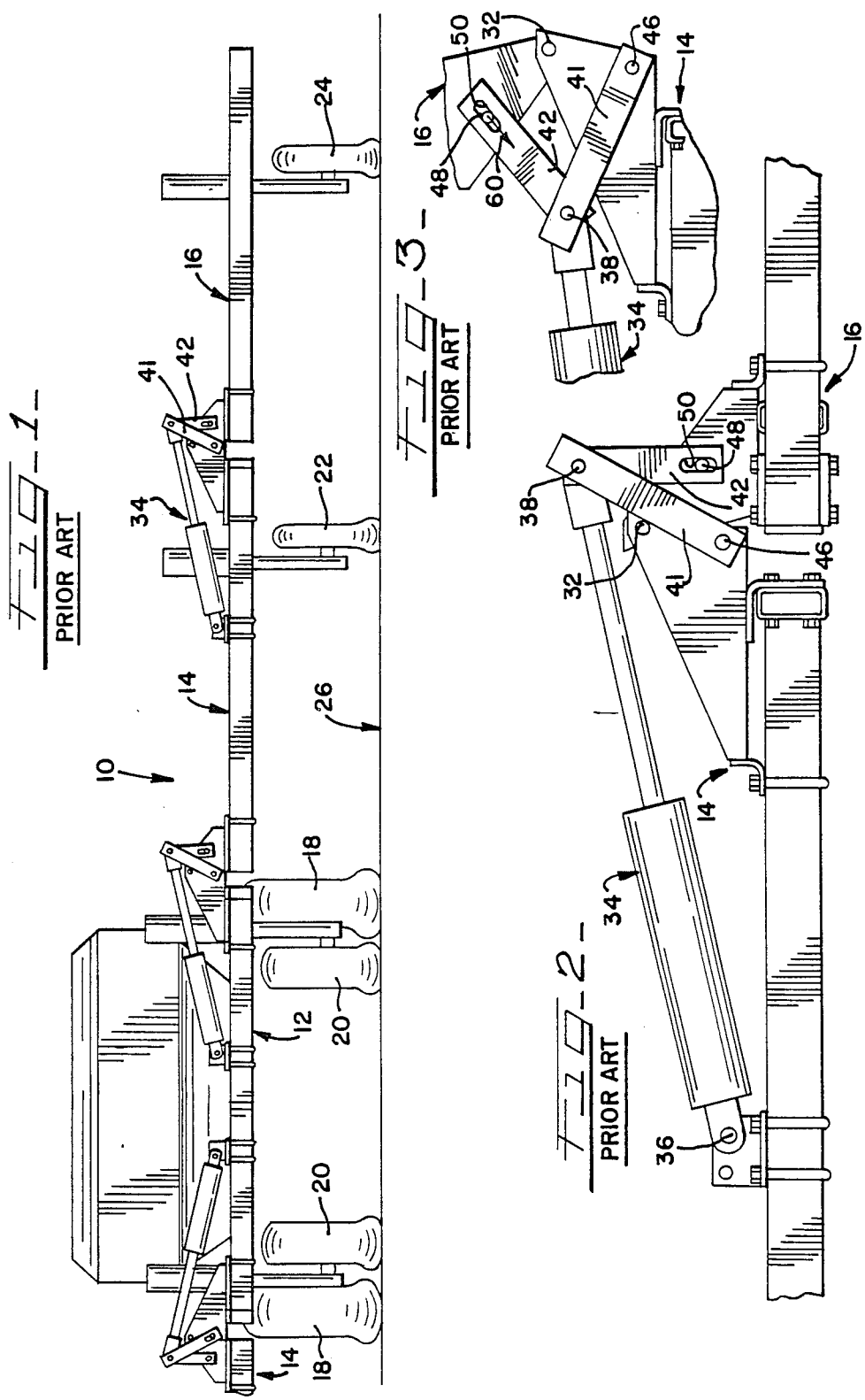

4,862,758

HINGE ASSEMBLY FOR FOLDING IMPLEMENT FRAME

This application is a continuation of application Ser. No. 871,364 filed June 6, 1986 now abandoned.

TECHNICAL FIELD

This invention relates to apparatus for use on mobile machines with outwardly extending portions. The invention is especially well suited for use on mobile agricultural machines which have pivotally connected tool bars or frame sections wherein one or more of the sections can be pivoted upwardly away from the ground to an inactive, transport position.

BACKGROUND OF THE INVENTION AND TECHNICAL PROBLEMS POSED BY THE PRIOR ART

Some conventional mobile agricultural machines are provided with two or more frame sections or tool bars that are pivotally connected together with a conventional hinge assembly that permits one frame section to pivot or "float" relative to the other when the machine is being operated with the frame sections in a lowered, ground-engaging position on uneven terrain. This accommodates vertical variation in the terrain across the width of the machine.

When a laterally extending frame section of such a machine is raised away from the ground and folded back toward the adjacent section beyond a certain angle—as when the machine is being prepared for transport along a highway—the conventional hinge assembly permits the raised section to freely fall a short distance toward the other frame section. This "free fall" results in the machine being subjected to undesired impact loading.

It would be desirable to provide a folding implement frame section hinge assembly with an improved construction which, in addition to accommodating frame section float when a frame section is in the lowered, ground-engaging position, would permit a frame section to be smoothly raised and lowered. It would also be desirable if the improved hinge assembly could prevent free fall of a raised frame section during the folding and unfolding operations so as to avoid subjecting the machine to undesired impact loading.

SUMMARY OF THE INVENTION

An improved implement floating hinge assembly is provided for accommodating the folding of pivotally connected first and second frame sections. The hinge assembly includes a first lever pivotally connected to the first frame section, a second lever connected between the second frame section and the first lever, and an extendable and retractable actuator pivotally connected between the first frame section and the second lever. In the improved assembly, the second lever is connected to the second frame section about a pivot axis that is fixed relative to the second frame section. A pin is movable with the second lever at a fixed distance from the pivot axis of the connection between the second frame section and the second lever. The first lever defines an elongated slot means for receiving the pin to accommodate relative movement between the pin and the first lever. With this arrangement, relative pivoting movement between the frame sections can occur even after the frame sections have been unfolded. Further, during the folding of the frame sections, the pin remains at one end of the slot means so that a free fall of one of the frame sections relative to the other does not occur. Numerous other features and advantages of the present invention will become readily apparent from the foregoing detailed description of the invention, from the claims, and from the accompanying drawings.

BRIEF DESCRIPTION OF THE DRAWINGS

In the accompanying drawings forming part of the specification, in which like numerals are employed to des like parts throughout the same, FIG. 1 is a fragmentary, rear elevational view of a mobile machine incorporating a conventional prior art floating frame hinge assembly for accommodating the folding of pivotally connected first and second frame sections;

FIG. 2 is a greatly enlarged, fragmentary, rear elevational view of the right-hand rear portion of the machine illustrated in FIG. 1 showing the hinge assembly with the frame sections in the lowered, ground-engaging position;

FIG. 3 is a view similar to FIG. 2, but showing the conventional hinge assembly moving toward the folded position;

DESCRIPTION OF THE PREFERRED EMBODIMENT

Prior Art Design

Figure 4:
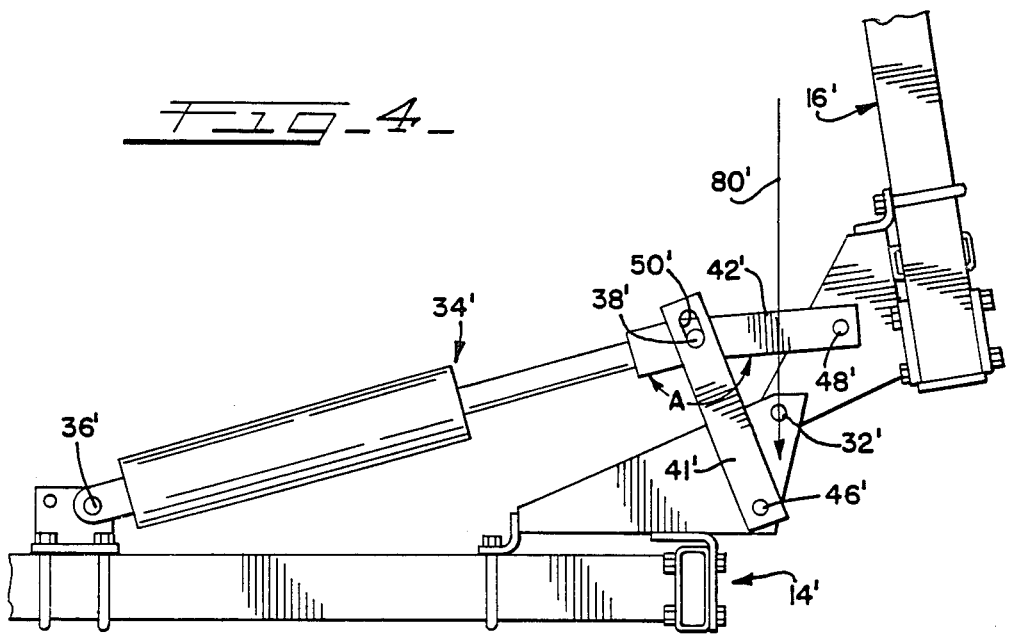
FIG. 4 is a view similar to FIGS. 2 and 3, but showing the novel hinge assembly of the present invention in operation to pivot or "fold" one of the frame sections toward a raised, inactive position.

Referring now to FIG. 1, a mobile machine is designated generally therein by reference numeral 10. The machine 10 includes a working implement comprising a central or main frame section 12 and pairs of frame sections 14 and 16 which laterally extend from either side of the central frame section 12. The frame sections typically carry working tools such as those associated with a planter, seed drill, etc. The machine 10 typically has a plurality of wheels 18, as well as wheels 20 associated with the main frame section 12, wheels 22 associated with the frame section 14, and wheels 24 associated with the frame section 16.

In operation, the machine 10 is moved over the ground 26 with the frame sections 14 and 16 in a lowered, ground-engaging position as illustrated in FIG. 1. To accommodate road transport of the machine 10, the frame sections are typically raised to an elevated, inactive position. To this end, the frame section 16 may be pivoted or folded over on top of the frame section 14 by means hereinafter described in detail so that the frame section 16 is generally parallel to the first frame section 14. The first frame section 14 can then be pivoted upwardly so that it is approximately perpendicular to the main frame section 12 but is preferably tilted a few degrees from the vertical towards the frame section 12.

As best illustrated in FIG. 2, each frame section 16 is pivotally connected on an end of the frame section 14 about a pin 32. Each frame section 16 is moveable between the raised, inactive position and a lowered, ground-engaging position by an extendable and retractable actuator 34. In the preferred embodiment illustrated, the actuator 34 is a dual acting hydraulic cylinder-piston actuator. At one end, the actuator 34 is pivotally connected to a portion of the frame 14, as at connection pin 36. At the other end, the actuator 34 is pivotally connected by means of a pin 38 to first and second levers 41 and 42, respectively.

The first lever 41 is pivotally connected by means of a pin 46 to the frame section 14, and the second lever 42 is attached to the frame section 16 by means of a pin 48 carried on the frame section 16 and which is received in a slot means or slot 50 defined in the second lever 42.

When the actuator 34 is in the extended position as illustrated in FIG. 2, the frame section 16 is in the lowered, ground-engaging position, and the pin 48 carried by the frame section 16 is positioned intermediate the ends of the slot 50 in the second lever 42. The arrangement of the pin 48 in the slot 50 permits the frame section 16 to pivot or "float" relative to the frame section 14 when uneven terrain is encountered by the machine 10. Relative pivoting movement between the frame sections is easily accommodated because of the relative movement that is permitted between the second lever 42 and the pin 48 in the elongated slot 50 of the lever 42.

When it is desired to raise the frame section 16 to the elevated or inactive position, the actuator 34 is retracted. With reference to FIG. 2, this causes the first lever 41 to pivot about pin 46 (counterclockwise as viewed in FIG. 2). This also moves the second lever 42 relative to the pin 48. As the levers 41 and 42 are moved, the pin 38 necessarily first moves upwardly in an arc, and this causes the lever 42 to be pulled upwardly so as to cause the frame section 16 to be pivoted upwardly with the pin 48 at the bottom end of the slot 50 in the second lever 42. The second lever 42 is under tension loading as this occurs.

Eventually, the frame section 16 is pivoted about pin 32 to the orientation wherein the center of gravity of the frame section 16 is located on the other side of the pin 32 (on the left side of the pin 32 as viewed in FIG. 3). At this point, the force of gravity acts to pull the frame section 16 downwardly in the counterclockwise direction around pin 32, and the pin 48 moves with the frame section 16 away from the end of the slot 50 (in the direction of the arrow 60 illustrated in FIG. 3). The frame section 16, and the pin 48 carried thereon, thus undergo a "free fall" until the pin 48 hits the other end of the slot 50. This causes an undesirable impact loading on the machine 10.

It is to be noted that when the pin 48 initially slides away from the end of the second lever slot 50, the tension loading on the lever 42 drops to zero, and when the pin 48 impacts at the other end of the slot 50, the loading on the second lever 42 becomes compressive. Continued retraction of the actuator 34 effects continued movement of the second lever 42 (toward the left as viewed in FIG. 3), and the pin 48, owing to the weight of the frame section 16, then moves with the lever 42 at the end of the slot 50 until the pivoting action has been completed and the frame section 16 is substantially parallel to the frame section 14.

To unfold the frame sections, the actuator 34 is extended, and the frame section 16 is pivoted back to the lowered, ground-engaging position. As the center of gravity of the frame section 16 passes back to the other side of the pivot pin 32, the frame section 16 again undergoes a "free fall" as the pin 48 moves from one end of the second lever slot 50 to the other end of the slot 50. This causes another impact loading on the machine 10 as the loading on the second lever 42 changes from compression to tension.

The conventional frame hinge assembly illustrated in FIGS. 2 and 3 may also be employed with respect to the connection between the frame section 12 and the frame section 14 illustrated in FIG. 1. However, the frame section 14 would typically be pivoted to an inactive, elevated position relative to the frame section 12 only after the frame section 16 had been folded over relative to the frame section 14. Also, the frame section 14, with the folded over frame section 16, would typically not be folded over completely parallel to the frame section 12, but rather, would be pivoted just slightly past the vertical.

The Improved Frame Hinge Assembly Of The Present Invention

Figure 5:
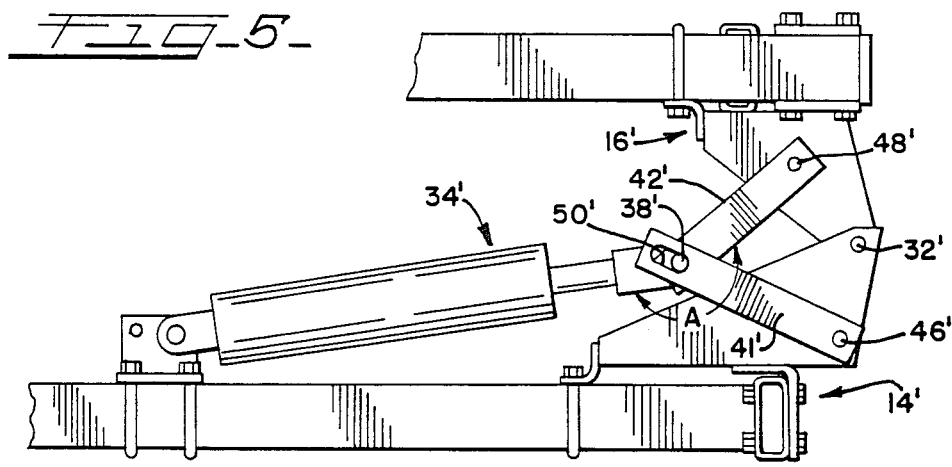
FIG. 5 is a view similar to FIG. 4, but showing the hinge assembly of the present invention in a fully folded position.

FIGS. 4 and 5 illustrate the improved frame hinge assembly of the present invention which is shown connecting a first frame section 14' and a second frame section 16'. The first frame section 14' is pivotally connected to the second frame section 16' about a pin 32' in the same manner as the frame sections 14 and 16 described above with reference to FIGS. 1-3.

A first lever 41' is pivotally connected by means of a pin 46' to the first frame section 14'. A second lever 42' is pivotally mounted about a fixed axis by means of a pin 48' to the second frame section 16'. An extendable and retractable actuator 34', such as an hydraulic cylinder-piston actuator, is pivotally connected by means of a pin 36' to the first frame section 14'.

There is a common connection of the first lever 41', the second lever 42', and the actuator 34' to accommodate relative pivoting movements during extension and retraction of the actuator 34'. The common connection includes a pin 38' which is mounted for movement with the second lever 42' at a fixed distance from the pivot axis defined by the pin 48' which connects the second lever 42' to the second frame section 16'.

The pin 38' is received within an elongated slot 50' defined by the first lever 41'. The pin 38' may be mounted to the assembly in a variety of ways. The pin 38' may be journaled within both the end of the actuator 34' and the end of the second lever 42'. On the other hand, the pin 38' may be fixedly attached to the end of the second lever 42' and journaled within the end of the actuator 34'. Alternatively, the pin 38' may be fixedly attached to the end of the actuator 34' and journaled within the second lever 42'. Also, the pin 38' may be separate from the pivotal connection between the actuator 34' and the second lever 42'. However, in the preferred embodiment illustrated, the actuator 34' is pivotally connected to the second lever 42' about a pivot axis that is colinear with the longitudinal axis of the pin 38'.

In the preferred embodiment illustrated in FIGS. 4 and 5, the elongated slot 50' is defined, in part, by opposed straight side surfaces that are parallel to, and equally distant from, a straight line extending between the pin 38' and the connection of the first lever 41' to the first frame section 14' at the pin 46'. Also, in the preferred embodiment, the width of the elongated slot 50' is substantially equal to the diameter of the pin 38' for accommodating the pin 38' in sliding engagement.

With the novel hinge assembly of the present invention, it is possible for the frame sections 14' and 16' to be oriented in an unfolded, generally coplanar orientation (similar to the orientation of the frame sections 14 and 16 of the prior art assembly illustrated in FIG. 2). In such an orientation, the first lever 41' and the second lever 42' define an acute included angle. In this unfolded orientation, the pin 38' is positioned intermediate the ends of the slot 50' when the machine is on level ground. The slot 50' thus permits relative movement between the pin 38' and the first lever 41'. This accommodates relative pivoting movement or "float" between the unfolded frame sections 14 and 16 when uneven terrain is encountered.

When it is desired to raise the second frame section 16' to an inactive position, the actuator 34' is retracted as illustrated in FIG. 4. This results in the first lever 41' pivoting about the pin 46'. The pin 38' is engaged by the first lever 41' at the bottom of the slot 50' and is carried in an arc with the lever 41'. This subjects the second lever 42' to tension and raises the lever 42' so as to pivot the second frame section 16' about the main hinge pin 32'.

The novel hinge assembly of the present invention does not subject the machine to impact loading when the frame section 16' is folded or raised to the inactive position. As the frame section 16' is raised, the weight of the frame section causes the pin 38' to exert a force on the first lever 41' at the bottom of the slot 50'. The first lever 41' is thus compressively loaded between the pin 38' and the pivot pin 46'. At the position illustrated in FIG. 4, the center of gravity of the frame section 16' is directly over the main hinge pivot 32'. In FIG. 4, the center of gravity force from the weight of the frame section 16' is schematically illustrated by arrow 80'. Up to this point, the second lever 42' is in tension, and beyond this point (as the frame section 16' pivots further in the counterclockwise direction as viewed in FIG. 4), the second lever 42' is in compression.

In FIG. 4, it is seen that the lines of action of the actuator 34' and second lever 42' intersect at an obtuse angle A. As the frame section 16' pivots further (counterclockwise as viewed in FIG. 4), the angle A increases as the lines of action become colinear at an over center position, and then the angle A becomes a reflex angle beyond the over center position (FIG. 5).

Beyond the orientation illustrated in FIG. 4 but before the angle A becomes a reflex angle, the pin 38' initially becomes subjected to a combined force resulting from the compressive force in the second lever 42' and the actuator 34'. This combined force on the pin 38' is directed toward the top end of the elongated slot 50' in the first lever 41'. However, the weight of the actuator 34' and the weight of the second lever 42', along with frictional forces, maintain the pin 38' at the bottom of the elongated slot 50'.

As the frame section 16' continues to pivot to the folded position (counterclockwise as viewed in FIG. 5) and the angle A becomes a reflex angle, the resulting force on the pin 38' from the second lever 42' and the actuator 34' changes direction from toward the top of the slot 50' to toward the bottom of the slot 50'. The pin 38' thus remains at the bottom of the slot 50' during the frame folding sequence. The hinge assembly thus permits the frame section 16' to be folded smoothly to the fully folded position illustrated in FIG. 5 without any free fall impact loading of the assembly.

The novel hinge assembly permits smooth unfolding of the frame sections when actuator 34' is extended to reverse the above-described sequence. However, if the frame sections are unfolded on ground that is not level, there may be some slight free fall of the frame section 16' relative to the frame section 14' around the mid-range position (such as illustrated in FIG. 4). However, in this mid-range position, the elongated slot 50' in the first lever 41' is almost perpendicular to the actuator 34' and to the second lever 42'. Thus, any free fall will be minimal under such conditions.

It will be readily observed from the foregoing detailed description of the invention and from the illustrated embodiment thereof that numerous variations and modifications may be effected without departing from the spirit and scope of the novel concepts or principles of this invention.

What is claimed is:

1. In an implement floating frame hinge assembly for accommodating the folding of pivotally connected first and second frame sections connected by frame pivot means, wherein a first lever is pivotally connected at a first end thereof to said first frame section and is movable relative to said first frame section, a second lever is pivotally connected at a first end thereof to said second frame section and extends between said second frame section and a second end of said first lever and is pivotally connected at its second end to said second end of said first lever, and an extendable and retractable actuator is pivotally connected between said first frame section and said second lever, the improvement characterized in that said second lever is connected to said second frame section at said first end of said second lever about a pivot axis fixed relative to said second frame section and said second lever; a pin mounted on said second end of said second lever which is movable with said second lever about said pivot axis relative to said frame pivot means; said actuator is pivotally connected to said second lever at its second end about a pivot axis that is colinear with the longitudinal axis of said pin, and there is a common connection including said pin, said second end of said first lever, said second end of said second lever and said actuator to accommodate relative pivoting movements during extension and retraction of said actuator, and said first lever defines an elongated slot means for receiving said pin to accommodate relative movement between said pin and said first lever whereby relative pivoting movement between said frame sections can occur even after the frame sections have been unfolded and whereby, during the folding of said frame sections, said pin remains at one end of said slot means under the influence of gravity acting on said actuator to urge said pin generally downwardly in said slot means.

2. The improvement in accordance with claim 1 further characterized in that said elongated slot means is defined, in part, by opposed straight side surfaces that are parallel to, and equally distant from, a straight line extending between said pin and said pivot connection of said first lever to said first frame section.

3. The improvement in accordance with claim 1 further characterized in that said elongated slot means has a width substantially equal to the diameter of said pin for accommodating said pin in sliding engagement.

* * * * *